Sept. 4, 1923.
L. D. SMITH
SUBCARGO UNLOADING APPARATUS FOR SHIPS
Filed Feb. 14, 1923
1,466,854
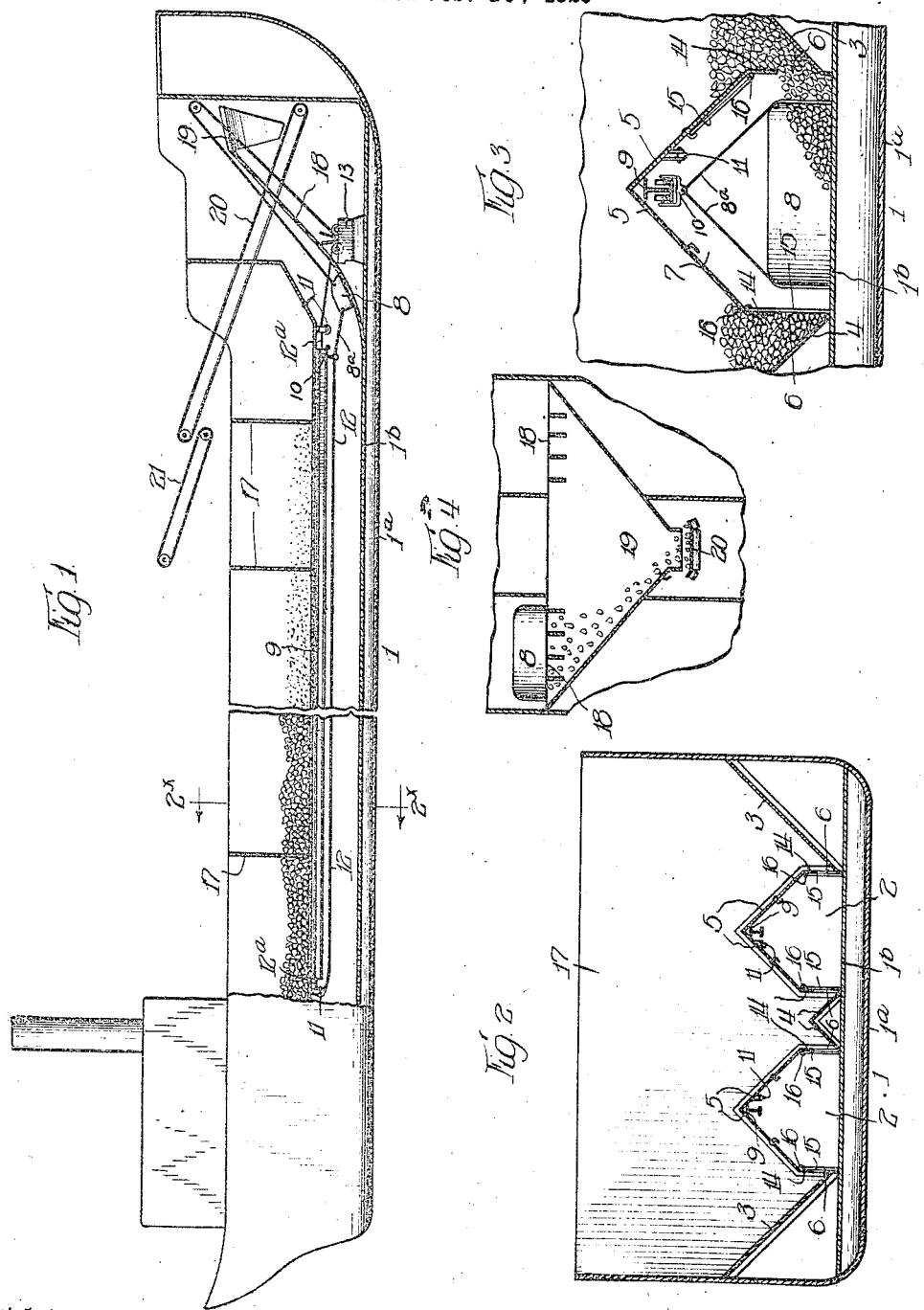
Witness:
R. Burkhardt
Inventor:
Leathem D. Smith Patented Sept. 4, 1923.

1,466,854

UNITED STATES PATENT OFFICE.

LEATHEM D. SMITH, OF STURGEON BAY, WISCONSIN.

SUBCARGO-UNLOADING APPARATUS FOR SHIPS.

Application filed February 14, 1923. Serial No. 618,885.

*To all whom it may concern:*

Be it known that I, LEATHEM D. SMITH, a citizen of the United States, residing at Sturgeon Bay, in the county of Door and State of Wisconsin, have invented certain new and useful Improvements in Subcargo-Unloading Apparatus for Ships, of which the following is a specification.

This invention relates to an apparatus through means of which bulk cargo of subdivided material may be withdrawn from a transport container, such as the hold of a vessel, by a systematic and continuous attack upon the bottom of the pile at a location toward which the entire cargo will gradually feed by gravity.

It has long been proposed to provide in the hold of a vessel, drag scrapers, scoops, or the like, resting upon the top of the pile of subdivided material to be removed, and directed in their travel through a path that advances the material toward a point of discharge, but such an arrangement is unsatisfactory and ineffective, particularly in the matter of carrying the material past the point of discharge because the scraper or advancing means is working upon the top of the mass and at a constantly changing level. It has also been proposed to utilize a conveying belt beneath a cargo in a position toward which the material feeds by gravity, but this arrangement, while known for many years, has failed of general adoption by reason of the expense of installing and maintaining such an equipment and the relatively large space required for its accommodation with consequent reduction in hold capacity. It has even been proposed to employ a roofed trough with side openings to admit material, such as cereal grains, and to locate such a trough beneath the cargo in a position toward which the material will gravitate and locate in the bottom of said trough an endless screw for advancing the material toward a point of discharge. But this arrangement is objectionable in that it involves practical submergence of the conveying element by the material being handled.

The object of the present invention is to provide an improved power driven apparatus for removing bulk cargo of subdivided material from the hold of a vessel, and particularly one which will be adapted for handling heavy, harsh, and highly abrasive materials which may lack uniformity of size in their subdivision. Accordingly, the invention proceeds upon the principle of providing, subcargo, a tunnel preferably designed in itself to direct the flow of subdivided material toward its own side or sides, and associating it with other deflecting surfaces which so direct the flow of material; the tunnel being open at a side or sides to admit the material within it in restricted quantities, or at an angle of repose inherent in the material being handled; and, the construction of the tunnel being such that it will at all times maintain above the material so admitted an unobstructed passageway or channel of attack which affords access to the top of the restricted body of material in the tunnel, for conveying means, preferably in the form of a drag scraper, and for the mounting and controlling equipment for such conveying means as well as for the operatives or attendants who may find it necessary to enter the space during unloading, for upkeep or management of the conveying apparatus as well as for control of the side openings of the tunnel.

A further object of the invention is to provide a conveying apparatus which will not only serve to systematically attack and advance material from beneath the cargo, but by continued movement of the conveying apparatus will forward the material to an upper level and either out of the vessel or within reach of additional apparatus which will remove it.

In order that the invention may be fully understood, the preferred embodiment is shown in the accompanying drawings, wherein—

Figure 1 is a side elevation, partly in longitudinal section, of a vessel and unloading equipment embodying the several features of the invention.

Figure 2 is a section on the line $2^x$—$2^x$ of Figure 1, taken on an enlarged scale.

Figure 3 is a detail sectional view on a still larger scale.

Figure 4 is an enlarged sectional view of the means for receiving and disposing of the material delivered by the drag scraper.

1 represents the hull of a vessel which may be provided with the usual water bottom $1^a$ and main cargo bottom $1^b$. 2 represents tunnels extending longitudinally of the hold of the vessel, over the bottom 1ᵇ thereof, and in positions to admit by gravity directly upon said bottom through open sides of said tunnels subdivided material loaded in bulk; suitable cant boards 3 and 4 being provided in the hold to so direct the flow of the material; and the roof 5 of each tunnel being likewise inclined for the same purpose. By this arrangement, the spaces beneath the tunnels serve to receive and contain cargo material, and their capacity, except for the spaces maintained over the bulk of material admitted thereto, is added to the normal available space of the hold. In other words, the cargo is loaded all the way across the bottom of the hold in securing full capacity; and there is maintained, longitudinally of the hold, at intervals, by the apexes of tunnels, conveying spaces acting upon the top of the portion of the cargo which is within the tunnels.

As shown in Figure 3, the tunnels are provided with side openings 6 of such a nature that the admission of subdivided material to the tunnel will be restricted below a level which will leave above the material a constantly open and unobstructed passageway 7 which constitutes a channel of attack in a downward direction upon the restricted bed of material, through means of a drag line scraper 8 or other suitable means for advancing the admitted material in the direction of the length of the tunnel and toward a point of discharge. The space automatically maintained by the tunnel above the admitted material is further employed to receive means through which to control the movements of the scraper or conveyor, such, for instance, as the track 9 with trolley 10 and sheaves 11 for the return line 12ᵃ of the traction cable 12 under control of the reversely driven winding drums 13 through which the scraper is driven. While the illustration contained in the drawing is intended to be largely schematic and merely suggestive of known arrangements of drag line scrapers, it may be noted that the lower lead of the line 12 plays through the trolley 10 and is connected with the rear end of the scraper through means of the bridle 8ᵃ.

In addition to having the side openings 6 equipped for measuring the inflow of material into the tunnel, as, for instance, by the depending fixed walls 14, said openings are provided with doors 15 hinged at 16 and adapted to be separately manipulated so as to determine what longitudinal section of the tunnel will be opened for the admission of the material. This arrangement of doors in a tunnel which accommodates conveying means and affords a passageway through which the conveying means may be drawn back to any point of the tunnel, is of special advantage in that it adapts the unloading apparatus for use in a vessel hold subdivided as by partitions 17 (Figure 1) into a number of compartments which may be loaded with as many different kinds of material, and from which it may be desired to discharge the several materials separately and without mixing by the use of one and the same permanently installed apparatus.

Two important features of the present invention are the location of the tunnels immediately over the cargo bottom of the hold of the vessel without additional false bottoms, and the designing of the tunnel in a manner to restrict the material admitted thereto and maintain over the admitted material the unobstructed passageway or channel of attack.

A further important feature of the invention, particularly in the preferred embodiment thereof, resides in the provision of means, such as skids 18, as continuations of the bottoms of the tunnels over which the drag line scraper 8 or equivalent conveying means may travel with its load to elevate the material from the tunnel before discharging it, as, for instance, to a point over a hopper 19, which delivers the material upon a system of conveying belts 20, 21, as shown in Figures 1 and 4.

I claim:

1. In combination with a cargo vessel and its cargo supporting bottom, a conveyor tunnel spaced above said bottom and freely admitting cargo material beneath it except in the upper portion of the tunnel, and leaving the bottom free from obstruction beneath the tunnel and thereby adding the lower portion of the tunnel space to the normal carrying capacity of the vessel; conveying means being provided in the upper portion of the tunnel for attacking the cargo material from above.

2. In combination with a cargo vessel and its normal cargo supporting bottom, unloading mechanism immediately over said bottom, leaving the portion of the bottom there beneath free from obstruction and available as a part of the normal cargo capacity; said unloading mechanism comprising an open sided tunnel having a conveyor space in the top thereof and constructed to freely permit bulk cargo of subdivided material to flow into and fill the same, except in its said conveyor space at the top, thereby adding the main content of the tunnel covered space to the carrying capacity of the vessel and maintaining low center of gravity in the cargo, and a conveyor in said conveyor space adapted to attack from above the cargo material lying beneath it.

3. In combination with a cargo vessel and its cargo supporting bottom, a conveyor tunnel spaced above said bottom and freely admitting cargo material beneath it except in the upper portion of the tunnel, and leaving the bottom free from obstruction beneath the tunnel and thereby adding the lower portion of the tunnel space to the normal carrying capacity of the vessel; conveying means being provided in the upper portion of the tunnel for attacking the cargo material from above; said means comprising a scraper for acting upon the top of the cargo lying beneath the tunnel, and a drag line for said scraper including a primary lead and return lead, both of which are located in the top space of the tunnel.

Signed at Sturgeon Bay, Wisconsin, this 10th day of February, 1923.

LEATHEM D. SMITH.